United States Patent [19]

Rolt et al.

[11] 4,040,271

[45] Aug. 9, 1977

[54] VISCOUS SHEAR COUPLINGS

[75] Inventors: Anthony P. R. Rolt, Stratford-on-Avon; Frederick J. Walker, Banbury; Oswald Webb, Coventry, all of England

[73] Assignees: Harry Ferguson Limited, Moreton-in-March; GKN Transmissions Limited, Birmingham, both of England

[21] Appl. No.: 624,980

[22] Filed: Oct. 22, 1975

[51] Int. Cl.² .................. F16D 3/80; F16H 1/44; F16D 19/00; F16D 31/00

[52] U.S. Cl. ........................................ 64/26; 74/711; 192/58 B; 192/82 T

[58] Field of Search ............... 74/710, 710.5, 711; 192/54, 58 B, 58 C, 85 AA, 57, 82 T; 64/26

[56] References Cited

U.S. PATENT DOCUMENTS

| 3,071,225 | 1/1963 | Blau et al. | 192/58 C |
|---|---|---|---|
| 3,236,346 | 2/1966 | Roper | 192/58 C |
| 3,385,408 | 5/1968 | Manning | 192/58 C |
| 3,760,922 | 9/1973 | Rolt et al. | 74/710.5 X |

FOREIGN PATENT DOCUMENTS

| 1,284,721 | 12/1968 | Germany | 192/58 C |

*Primary Examiner*—Samuel Scott
*Assistant Examiner*—Lance W. Chandler
*Attorney, Agent, or Firm*—Mason, Fenwick & Lawrence

[57] ABSTRACT

Viscous shear couplings for controlling the action of an interaxle or interwheel differential gear in a vehicle transmission are described. The couplings comprise a pack of interleaved annular plates which are free to float axially in an annular enclosure containing a viscous liquid. The enclosure incorporates a spring-loaded piston shiftable to vary the enclosure volume. The quantity of viscous liquid, in the range 85% to 100% of the minimum volume at ambient temperature, and the spring strength are chosen to give a predetermined pressure build-up within the enclosure with rise in temperature during shearing of the viscous liquid to tailor the torque-transmitting characteristics of the coupling to particular needs.

11 Claims, 9 Drawing Figures

VISCOUS SHEAR COUPLINGS

This invention relates to control couplings for interconnection between first and second rotatable members to control relative rotation therebetween. The invention is also concerned with the combination of a control coupling with differential gearing to control relative rotation between members of the gearing. such a combination of control coupling and differential gearing finds application in a 4-wheel-drive vehicle between the driven axles thereof and also between the individual wheels of a driven axle of a vehicle.

More particularly the invention is concerned with a control coupling, hereinafter referred to as being of the kind specified, comprising first and second mutually interleaved sets of annular plates arranged for rotation about a common axis within an enclosure containing a viscous liquid in contact with adjacent surfaces of said plates, the first set of plates being arranged for driving connection with a first rotatable member and the second set of plates being arranged for driving connection with a second rotatable member.

It is known that, in control couplings of the kind specified, heat will be generated in the coupling due to shearing of the viscous liquid during relative rotation of the plates of the two sets. Increase in the temperature of the viscous liquid causes a decrease in its viscosity and consequently a decrease in the torque transmitting ability of the coupling. Moreover the effective viscosity of the viscous liquid is inversely proportional to the rate of shearing so that the torque transmitting ability of the coupling tends to decrease with increase of the speed of relative rotation of the two sets of plates. Thus, in known couplings of the kind specified, the torque transmitting characteristic of the coupling for any given constant speed-difference between the two sets of plates is such that over a period of a few minutes from starting up from rest the value of torque transmitted reduces initially relatively rapidly and thereafter continues to reduce more slowly.

In certain practical applications of couplings of the kind specified, the aforesaid torque transmitting characteristic constitutes a disadvantage in that the reducing torque value makes it difficult to achieve consistent control over the rotatable members connected to the sets of plates.

An object of the present invention is to provide a control coupling of the kind specified wherein the aforesaid disadvantage is obviated or mitigated.

According to the present invention, there is provided a control coupling of the kind specified in which the plates of at least one set are free to move in directions parallel to said common axis, the enclosure incorporates an element which is movable independently of said plates to vary the volume of the enclosure, and in which resiliently yieldable means are provided to urge said element towards a limit position in which said volume has a minimum value, the strength of the resiliently yieldable means being chosen according to a desired torque transmitting characteristic for the coupling, and the quantity of viscous liquid within the enclosure being such that at an ambient temperature of 25° C and with the coupling at rest the viscous liquid occupies a volume in the range 85% to 100% of said minimum value.

We have found that there is a relationship between the torque transmitted and the pressure in the coupling. When the pressure in the coupling is caused by expansion of the viscous liquid on temperature rise during shearing of the liquid, and the plates of at least one set are free to move in directions parallel to the coupling axis, the torque developed is greater than would be predicted on the basis of known theory on viscous shear. We have found, for example, that a considerable torque increase is obtained simultaneously with a marked rise in pressure. By way of explanation, it is thought that small inequalities in plate-to-plate spacing, due possibly to complex thermal gradients in the coupling, give rise to a pressure drop across pairs of groups of the plates. Thus, these plate pairs or groups may be caused, by the increasing pressure to clutch and so augment the torque being produced by viscous shear alone. Pressure increase is controlled by movement of the element against the resiliently yieldable means and therefore a desired torque transmitting characteristic may be obtained by making appropriate choice in respect of the strength of the resiliently yieldable means.

The quantity of viscous liquid in the coupling at an ambient temperature of 25° C is between 85% and 100% of the minimum value of the enclosure volume. That is to say that when the element is in its limit position the whole of the enclosure will be full of liquid if the fill factor, that is the quantity of liquid in the enclosure, is 100% whereas if the fill factor is 85%, then 15% of the volume within the enclosure when the element is in its limit position will be free of liquid. The fill factor will affect the shape of the characteristic curves relating torque transmitted to time starting from rest. Thus, if there is a free space within the enclosure at ambient temperature this will reduce the torque transmitted at the onset of relative speed difference between the plate sets. It is to be understood that the said free space may be a vacuum, or filled with air or a gas.

This is useful where the control coupling is associated with differential gearing, as described herein, since it prevents any substantial torque being transmitted when there are small differences in speed between members of the gearing which may occur in service.

According to a further aspect of the present invention, the coupling is associated with differential gearing wherein two members of the gearing are connected respectively to the two sets of plates of the coupling.

The coupling thus controls the operation of the gearing. The gearing will normally have an input member and two output members and the coupling will be connected across the output members. Thus, if the differential gearing is between the wheels of a driven axle the coupling will be connected to the two outputs of the differential gearing, that is directly between the wheels of the driven axle. If the differential gearing is arranged as an inter-axle differential gearing in a 4-wheel-drive vehicle then the coupling will be connected between the outputs of the differential gearing, that is the parts of the differential gearing connected to the two driven axles.

Embodiments of the present invention will now be described, by way of example, with reference to the accompanying drawings in which.

Figure 1:
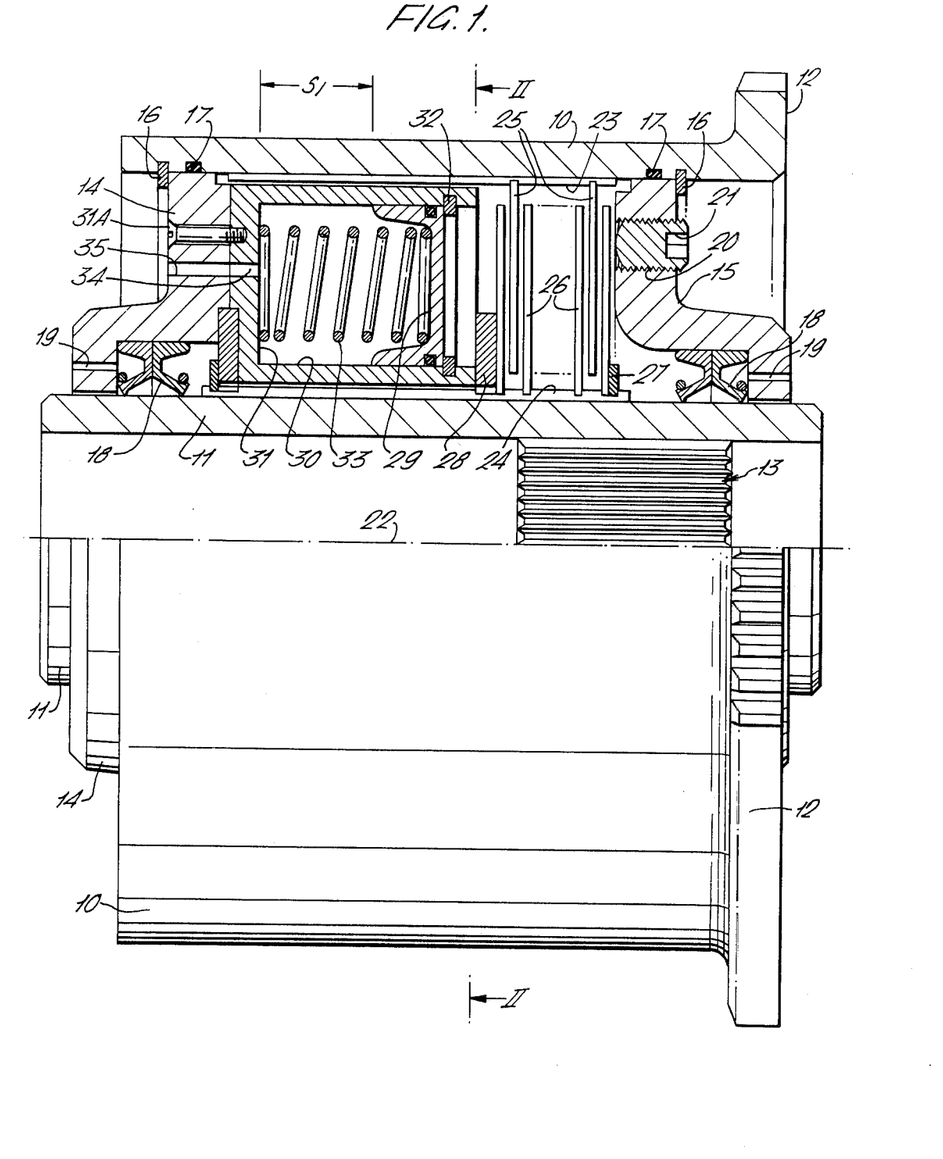
FIG. 1 is a part sectional view of a control coupling of the kind specified constituting a first embodiment of the present invention.
Figure 2:
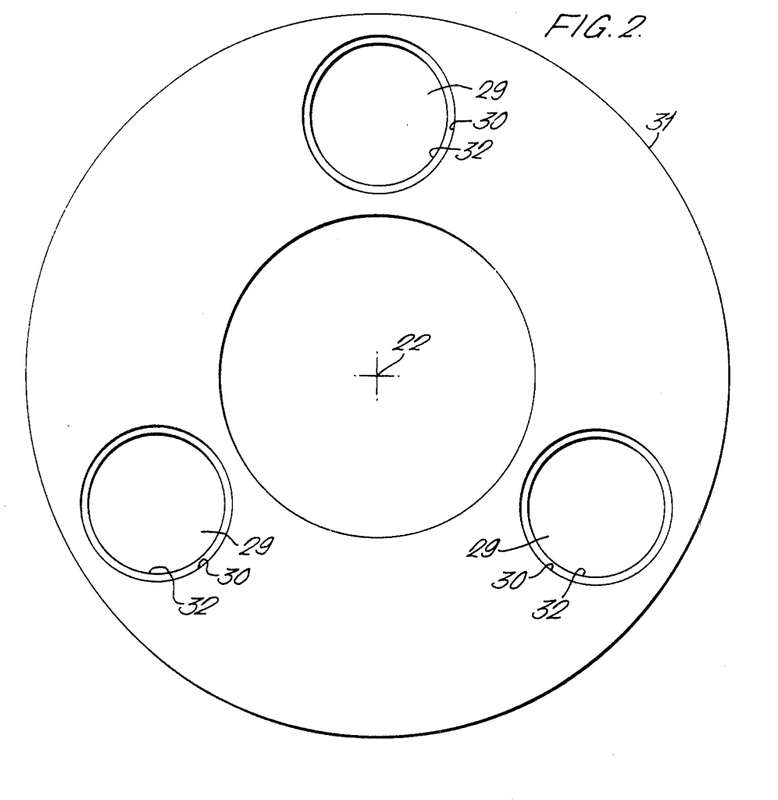
FIG. 2 is a view, on the line II—II in FIG. 1, of a component part of the control coupling of FIG. 1.

In FIGS. 1 and 2 of the drawings, the control coupling consists of mutually concentric and relatively rotatable outer and inner steel tubular walls 10 and 11 respectively. The outer wall 10 has a peripherally splined flanged 12 providing a means of connecting the outer wall 10 to a first rotatable member. The inner wall 11 has an internally splined portion 13 providing a means of connecting the inner wall 11 to a second rotatable member. The annular gap between the walls 10 and 11 is closed by means of axially spaced recessed steel end walls 14 and 15 which are located by retaining rings 16. The peripheral faces of the end walls 14 and 15 are sealed to the outer wall 10 in fluid tight manner by means of O-rings 17 which are accommodated in annular grooves cut in the inner surface of the wall 10. The end walls 14 and 15 rotate with the outer wall 10. Running seals 18 are accommodated in the recessed portions of the end walls 14 and 15. The outer sides of the running seals 18 are vented through vent holes 19 in the radially innermost portions of the end walls 14, 15. The walls 10, 11, 14 and 15 together constitute an enclosure into which viscous liquid can be introduced through a filling aperture 20 in the end wall 15. A plug 21 is provided for closing the filling aperture 20. To facilitate filling, a second aperture and plug (not shown) is provided for the purpose of allowing air to escape from the enclosure. The axis of the coupling is indicated by reference numeral 22.

The outer wall 10 is provided with internal splines of which one is indicated by reference numeral 23. The inner wall 11 is provided with external splines one of which is indicated by reference numeral 24. A first set of annular plates 25, each of which plates is externally notched, is engaged with the splines 23. A second set of annular plates 26, each of which is internally notched, is engaged with the splines 24. The plates 25 and 26 are mutually interleaved and free to move axially. The two sets of plates constitute a pack of plates and the pack is located on one side by a retaining ring 27 and on the other side by a spacer ring 28 which is internally splined and engages the splines 24. In relation to the distance between the retaining ring 27 and the spacer ring 28, the thickness of the plates 25, 26 is such that when the plates are equally spaced apart, the plate-to-plate spacing is of the order of 0.012 inch. The plates 25 and 26 are of mild steel and are preferably surface-hardened, for example by means of nickel plating.

The enclosure constituted by the walls 10, 11, 14 and 15 incorporates an element which is movable independently of the plates 25, 26 to vary the volume of the enclosure. In FIGS. 1 and 2, the said element is in the form of three pistons 29 which are slidable in respective bores 30 in an annular carrier 31 which lies adjacent the pack of plates within the enclosure. As seen in FIG. 2, the pistons 29 are equiangularly spaced around the coupling axis 22. The pistons 29 have a limit position in which the enclosure volume is a minimum, said limit position being determined by retaining rings 32 at the mouths of the bores 30. Each piston 29 is urged towards its limit position by resiliently yieldable means in the form of a compression spring 33 one end of which bears on the piston and the other end of which bears on the bottom of the associated bore 30. The end face of the carrier 31 adjacent the bottom end of the bores 30 bears on the inner face of the end walls 14 in fluid tight manner and is secured thereto by screws of which one is shown at 31A. The bores 30 are vented by way of mutually registering vents 34 and 35 in the carrier and in the end wall 14 respectively.

Figure 3:
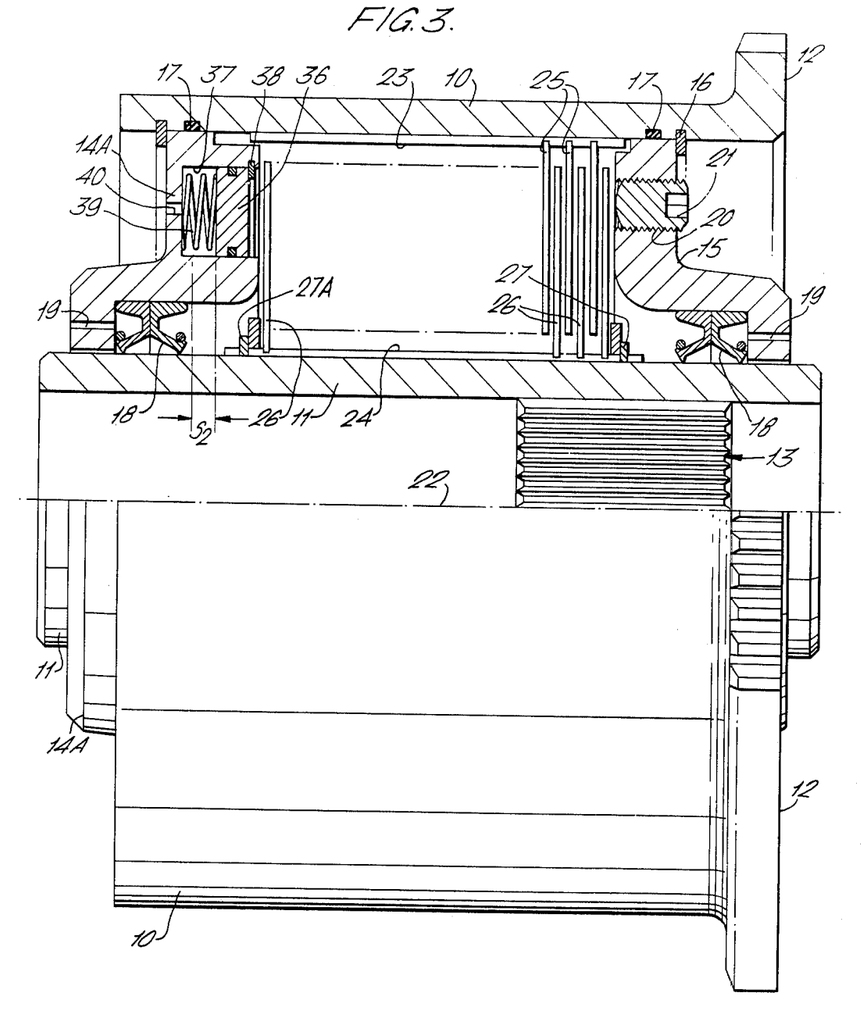
FIG. 3 is a part sectional view of a control coupling of the kind specified constituting a second embodiment of the present invention.

In FIG. 3, components which correspond to those described with reference to FIG. 1 are given the reference numerals used in FIG. 1. Thus, in FIG. 3, the walls 10, 11, 15 and a modified end wall 14A together form an enclosure containing a pack of plates 25, 26. In FIG. 3, the axial length of the plate pack is greater than in FIG. 1, there being a greater number of plates. In FIG. 3, the plate pack as a whole is located at one end by the retaining ring 27 and at the other end by another retaining ring 27A. The end wall 14A incorporates an annular piston 36 which is slidably received in an annular recess 37 which extends axially from the inner side face of the end wall 14A. The piston 36 is urged to a limit position against a retaining ring 38 by a compression spring 39 one end of which bears on the piston 36 and the other end of which bears on the bottom of the recess 37. The recess 37 is vented by way of a vent 40 through the end wall 14A. The piston 36 constitutes an element which is movable independently of the plates 25, 26 to vary the volume of the enclosure. When the piston 36 is at its limit position against the retaining rings 38, the volume of the enclosure is a minimum.

Figure 4:
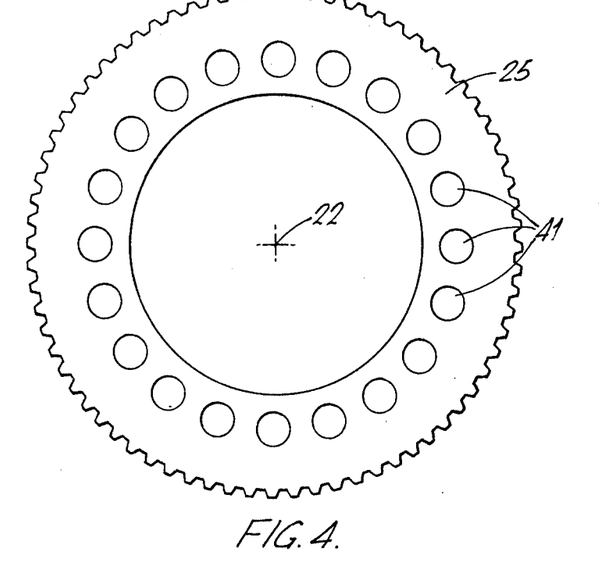
FIGS. 4 and 5 are, respectively, views showing the shape and configuration of annular plates used in the control couplings of FIGS. 1 and 3, to a smaller scale than FIGS. 1 and 3.
Figure 5:
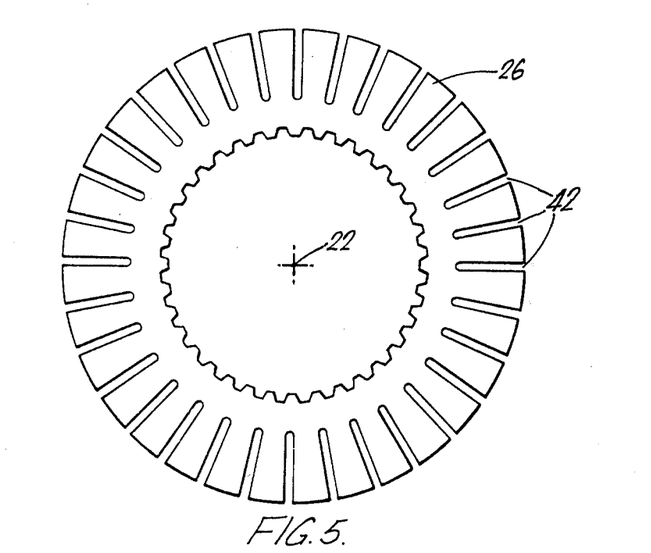

The shape and configuration of the plates 25, 26 are shown in FIGS. 4 and 5 respectively. The plates 25, being externally notched for engagement with the outer wall 10, may be conveniently termed "outer" plates; and the plates 26, being internally notched for engagement with the inner wall 11, termed "inner" plates. The outer plates 25 have through openings in the form of holes 41 arranged around the plate axis 22. The inner plates 26 have through openings in the form of radial slots 42. We have found that these holes and slots not only facilitate the introduction of viscous liquid into the enclosure, but also improve the performance of the control coupling in respect of its torque-transmitting capacity.

The enclosure contains a viscous liquid in contact with adjacent surfaces of the plates 25, 26. The viscous liquid is preferably a silicone oil and has a nominal viscosity in the range 1,000 to 150,000 centistokes. The quantity of viscous liquid within the enclosure is in the range 85% to 100% of the volume available for fluid within the enclosure when the movable element (pistons 29, FIGS. 1 and 2; or piston 36, FIG. 3) is at its said limit position. The viscous liquid may conveniently be introduced by a vacuum filling process.

The strength of the springs 33 or 39, and the fill factor are chosen according to a desired torque transmitting characteristic having regard to the explanations given later herein with reference to the graphs of FIGS. 6 to 8. Other variables such as the liquid normal viscosity, the initial nominal plate-to-plate spacing and general dimensions are determined on the basis of known data on viscous shear couplings, but modified as required by the novel teaching of the present invention.

Figure 6:
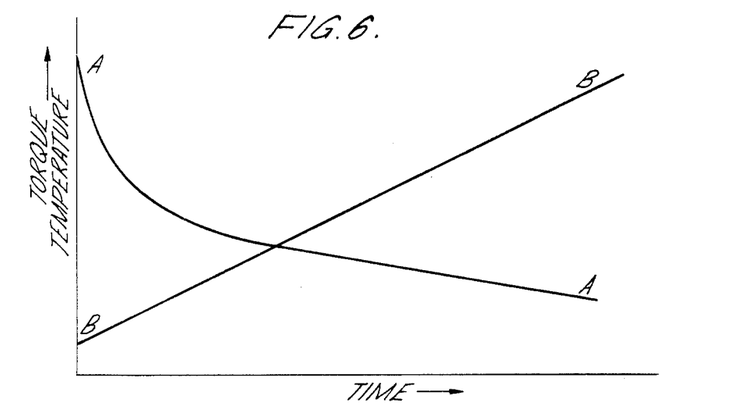
FIGS. 6 to 8 show various graphs illustrating generally certain relationships between time (abscisa) and torque, pressure or temperature (ordinate)

In FIG. 6, Graph A—A shows the general nature of the relationship between torque transmitted and time for a known control coupling of the kind specified when the coupling is operated starting from rest with a steady or constant speed difference between the two sets of plates. Graph B—B indicates the relationship between the average temperature of the coupling and time. From Graph A—A, it can be seen that the transmitted torque falls initially relatively rapidly and then more slowly while the average temperature of the coupling increases steadily. Heat generated due to shearing of the viscous liquid during relative rotation of the two sets of plates increases the temperature of the viscous liquid thus reducing the effective viscosity and therefore the torque-transmitting ability of the liquid.

Figure 7:
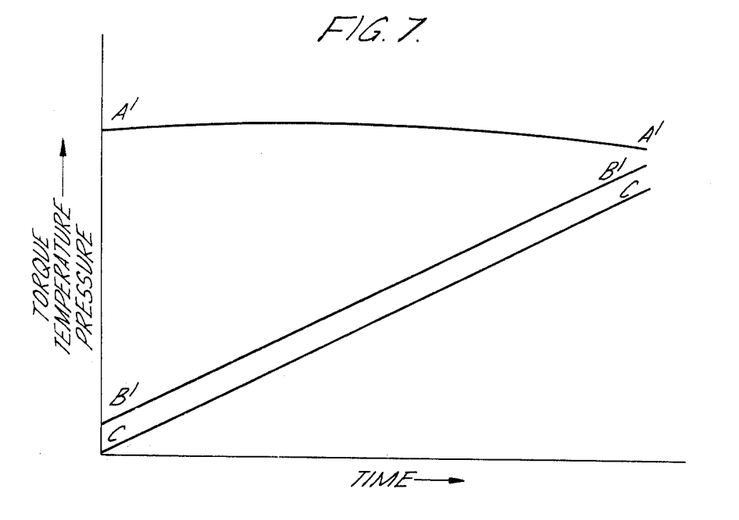

In FIG. 7, Graph A'—A' shows the general nature of the relationship between torque transmitted and time for a control coupling of the kind specified and as described with reference to FIGS. 1 and 2 or FIG. 3, the coupling being a gain operated starting from rest with a constant speed difference between the two sets of plates. In this case, the fill factor is 100%, that is to say the viscous liquid occupies all of the space available for fluid within the enclosure when the pistons 29 or 36 are at their limit position at an ambient temperature of 25° C. Graph B'—B' indicates the relationship between the average temperature of the coupling and time, and Graph C—C indicates the fluid pressure in the enclosure measured through a tapping (not shown) in the outer wall 10. From Graph A'—A', it can be seen that the transmitted torque remains substantially constant while the parameters of temperature and pressure steadily increase. As in the case of FIG. 6, heat generated lowers the effective viscosity and the torque-transmitting ability of the viscous liquid. However, in the case of FIG. 7, differential expansion between the viscous liquid and the material of the enclosure produces within the enclosure an immediate pressure build-up the magnitude of which is determined by the strength of the spring 33 or 39. As previously explained herein, torque transmission attributable to viscous shearing alone is augmented by plate-to-plate clutching under pressure. Thus, by experiment, a strength of spring 33 or 39 may be found that will provide torque augmentation by pressure clutching sufficient to compensate for torque loss due to reduced viscosity.

Figure 8:
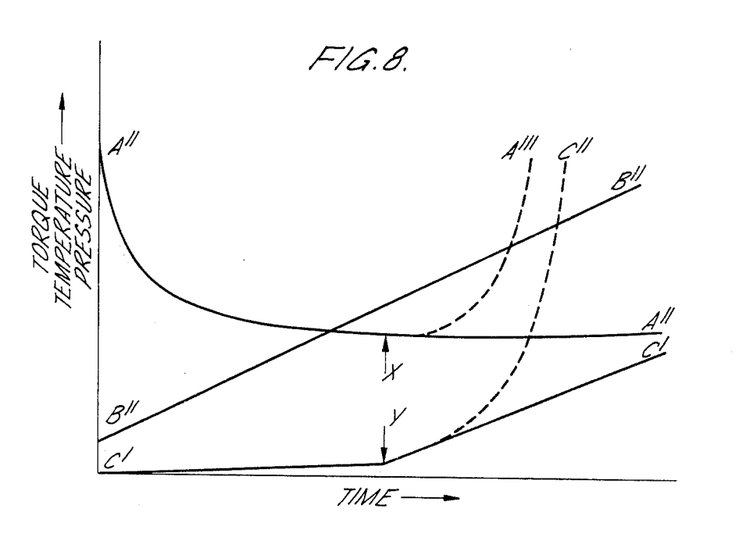

In FIG. 8, Graph A"—A" shows the general nature of the relationship between torque transmitted and time for a control coupling of the kind specified and as described with reference to FIGS. 1 and 2 or FIG. 3, the coupling being again operated starting from rest with a constant speed difference between the two sets of plates. In this case, the fill factor is 90%, Graphs B"—B" and C'—C' show the temperature/time and pressure/time characteristics as before. From Graph A"—A" it can be seen that the torque transmitted initially falls relatively rapidly and then steadies to a substantially constant value at a point X. Corresponding with the point X on the time scale (abscisa), there is a point Y on the pressure characteristic C'—C'. Up to the point Y on the pressure characteristic, the relatively small pressure rise is due to compression of the initial 10% air space within the enclosure resulting from differential expansion between the viscous liquid and the material of the enclosure. At the point Y, continued differential expansion brings into play the spring 33 or 39 the strength of which, in this case, is chosen to provide torque augmentation by plate-to-plate clutching sufficient to compensate for further torque reduction due to reducing viscosity.

By way of further explanation, the effect of fixing the pistons 29 or 36 at their limit position (which is the equivalent of the springs 33 or 39 having infinite strength) is shown in FIG. 8 by Graphs A'"—A'" and C'—C'. In this case, a rapid torque increase occurs simultaneously with a rapid pressure build-up from points X and Y on the torque and pressure characteristics respectively. It may therefore be appreciated that the shape of the torque characteristic to the right of point X can be "tailored" to meet desired requirements by appropriate choice of spring strength; and to the left of point X can be tailored by appropriate choice of fill factor. In this context, it may be noted that in the case of FIG. 7, where the fill factor is 100%, the point X may be regarded as lying on the ordinate. It is envisaged that both over-and under-compensation for torque reduction due to reduced viscosity may be achieved by appropriate choice of spring strength. In the context of this specification, reference to "spring strength" is to be taken as envisaging the possibility that variable rate springs may be used.

The references herein to "plate-to-plate clutching" are to be regarded as including two possibilities. The first possibility is that torque augmentation is attributable to direct or "dry" frictional contact between adjacent plates. The second possibility is that torque augmentation is produced by a clutching effect while there exists between adjacent plates an extremely thin film of viscous liquid.

In practical tests using the construction described with reference to FIGS. 1 and 2 or 3, it has been found that the minimum pressure within the enclosure to produce a significant augmentation of torque is of the order of 10 lbs/in².

In the embodiments above described with reference to FIGS. 1 and 2 or FIG. 3, the strokes of the pistons 29 and 36 (dimensions $S_1$ and $S_2$ in FIGS. 1 and 3 respectively) are more than sufficient to accommodate expansion of the viscous liquid within a practical temperature range, for example from ambient temperature up to a temperature of the order of 150° C measured on the outer wall 10. The total piston stroke required is, of course, dependent inter alia upon the fill factor chosen in any particular application. In a modification of the embodiments of FIGS. 1 and 2 or FIG. 3, the piston strokes $S_1$ or $S_2$ is limited so that the piston movement is positively arrested at a temperature within and near the upper limit of the temperature range envisaged. In this case, a marked or pronounced pressure-rise occurs accompanied by pronounced torque augmentation sufficient, possibly, to "lock" the coupling and so stop the further generation of heat. Subsequent temperature-drop would allow slipping to re-commence and in this way a cycling action may occur. In this modification, it may be desirable to incorporate a safety blow-out plug in one of the enclosure wall members, such plug being designed in known manner to give way at a set fluid pressure. In practice tests, pressures up to 400 lbs/in² have been sustained for short periods without damage to the coupling.

In a further modification of the embodiments of FIGS. 1 and 2 or FIG. 3, the vented chambers behind the pistons 29 and 36 are closed and the springs 33 and 39 are augmented or replaced by resiliently yieldable means in the form of a gas.

Figure 9:
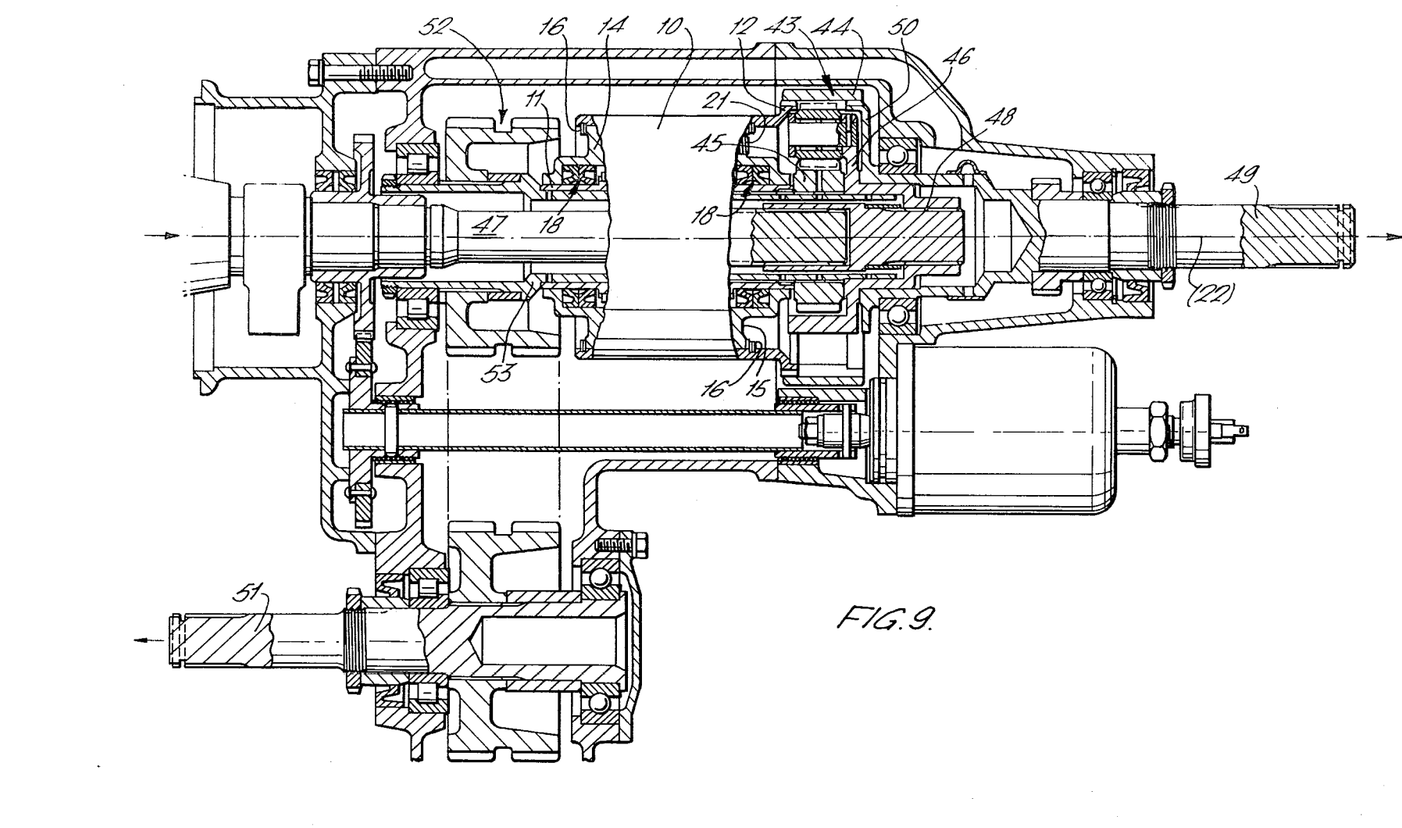
FIG. 9 is a sectional view of part of a motor vehicle 4-wheel-drive transmission incorporating a differential gear in association with a control coupling of the kind specified in accordance with the present invention.

In FIG. 9, a control coupling of the kind specified and as described with reference to FIGS. 1 and 2 or FIG. 3 or the above-mentioned modification thereof is associated with an inter-axle differential gear 43 in a 4-wheel-drive motor vehicle transmission unit. The differential gear 43 is of the spur gear type having an annular gear 44, a sun gear 45, and planet pinions on a planet carrier 46. The annular gear 44 and the sun gear 45 are outputs to rear and front axles (not shown) respectively, and the planet carrier 46 is the input. Drive from an engine (not shown) is transmitted to the planet carrier by way of an input shaft 47 one end of which has a splined driving connection 48 with the planet carrier 46. A rear output shaft 49 is in driving connection with the annular gear 44 by way of a peripherally splined flange element 50. A front output shaft 51 is in driving connection with the sun gear 45 by way of a transfer drive assembly 52 and a tubular drive shaft 53. The inner wall 11 of the control coupling is splined to the shaft 53, and the outer wall 10 of the control coupling is in driving connection with the annular gear 44 by way of flange 12. Thus, the control coupling is associated with the differential gear 43 in such a way as to control relative rotation between the annular gear 44 and the sun gear 45; that is, the coupling controls relative rotation between the front and rear outputs of the differential gear.

A control coupling of the kind specified and in accordance with the present invention may be associated either with an inter-axle or an inter-wheel differential gear in a motor vehicle transmission.

We claim:

1. A control coupling comprising mutually spaced and mutually interleaved plate elements arranged for rotation about a common axis within an enclosure containing a viscous liquid in contact with adjacent surfaces of said plate elements, alternate ones of said plate elements constituting a first set of plate elements for driving connection with a first rotatable member, remaining ones of said plate elements constituting a second set of plate elements for driving connection with a second rotatable member, the plates of at least one set being free to move in directions parallel to said common axis, the enclosure including movable means movable independently of said plates for varying the volume of the enclosure and resiliently yieldable means provided to urge said movable means towards a limit position in which said volume has a minimum value, the strength of the resiliently yieldable means being chosen according to a desired torque transmitting characteristic for the coupling, and the quantity of viscous liquid within the enclosure being such that at an ambient temperature of 25° C and with the coupling at rest the viscous liquid occupies a volume in the range of 85% to 100% of said minimum value.

2. A control coupling according to claim 1, wherein the viscous liquid has a nominal viscosity in the range 1000 to 150,000 centi-strokes.

3. A control coupling according to claim 2, wherein the viscous liquid is a silicone liquid.

4. A control coupling according to claim 1, including means defining openings through the said surfaces of the plates.

5. A control coupling according to claim 4, wherein the means defining openings through the surfaces of the plates of one of said sets comprises a plurality of through apertures arranged around said common axis, and the means defining openings through the surfaces of the plates of the other of said sets comprises a plurality of open-ended slots arranged around said common axis.

6. A control coupling according to claim 5, wherein the said enclosure comprises mutually concentric tubular walls relatively rotatable about said common axis and adapted respectively for driving connection with first and second rotatable members, the plates of one of said sets being in driving connection with the outer of said walls, and the plates of the other of said sets being in driving connection with the inner of said walls.

7. A control coupling according to claim 6, wherein the plates having the said plurality of through apertures are in driving connection with the outer of said walls, and the plates having the said plurality of open-ended slots are in driving connection with the inner of said walls.

8. A control coupling according to claim 1, including means within the enclosure defining a recess, and said element is a piston slidably received in said recess.

9. A control coupling according to claim 1, in combination with a differential gearing having an input element and two output elements, one of said sets of plates being in driving connection with one of the said elements of the gearing, and the other of said sets of plates being in driving connection with another of the said elements of the gearing.

10. A control coupling comprising mutually spaced and mutually interleaved plate elements arranged for rotation about a common axis within an enclosure containing a viscous liquid in contact with adjacent surfaces of said plate elements, alternate ones of said plate elements constituting a second set of plate for driving connection with a first rotatable member, remaining ones of said plate elements consituting a second set of plate elements for driving connection with a second rotatable member, the plates of at least one set being free to move in directions parallel to said common axis, the enclosure including movable means movable independently of said plates for varying the volume of the enclosure, and resiliently yieldable means provided to urge said movable means towards a limit position in which said volume has a minimum value, the strength of the resiliently yieldable means being such as to allow the said element to move away from said limit position only when fluid pressure within the enclosure exceeds a value of at least 10 lbs/in$^2$, and the quantity of viscous liquid within the enclosure being such that at an ambient temperature of 25° C and with the coupling at rest the viscous liquid occupies a volume in the range of 85% to 100% of said minimum value.

11. A control coupling comprising mutually spaced and mutually interleaved plate elements arranged for rotation about a common axis within an enclosure containing a viscous liquid in contact with adjacent surfaces of said plate elements, alternate ones of said plate elements constituting a first set of plate elements for driving connection with a first rotatable member, remaining ones of said plate elements constituting a second set of plate elements for driving connection with a second rotatable member, the plates of at least one set are free to move in directions parallel to said common axis, the enclosure including movable means movable independently of said plates to vary the volume of the enclosure, and resiliently yieldable means provided to urge said movable means towards a limit position in which said volume has a minimum value, the strength of the resiliently yieldable means being such as to allow the said element to move away from said limit position only when fluid pressure within the enclosure exceeds a value chosen according to a desired torque transmitting characteristic for the coupling, and the quantity of viscous liquid within the enclosure being such that at an ambient temperature of 25° C and with the coupling at rest the viscous liquid occupies a volume in the range of 85% to 100% of said minimum value.

* * * * *